Feb. 10, 1970  D. J. ROYER  3,494,104
CHROMATOGRAPHIC SEPARATION METHOD AND APPARATUS
Filed April 16, 1969  2 Sheets-Sheet 1
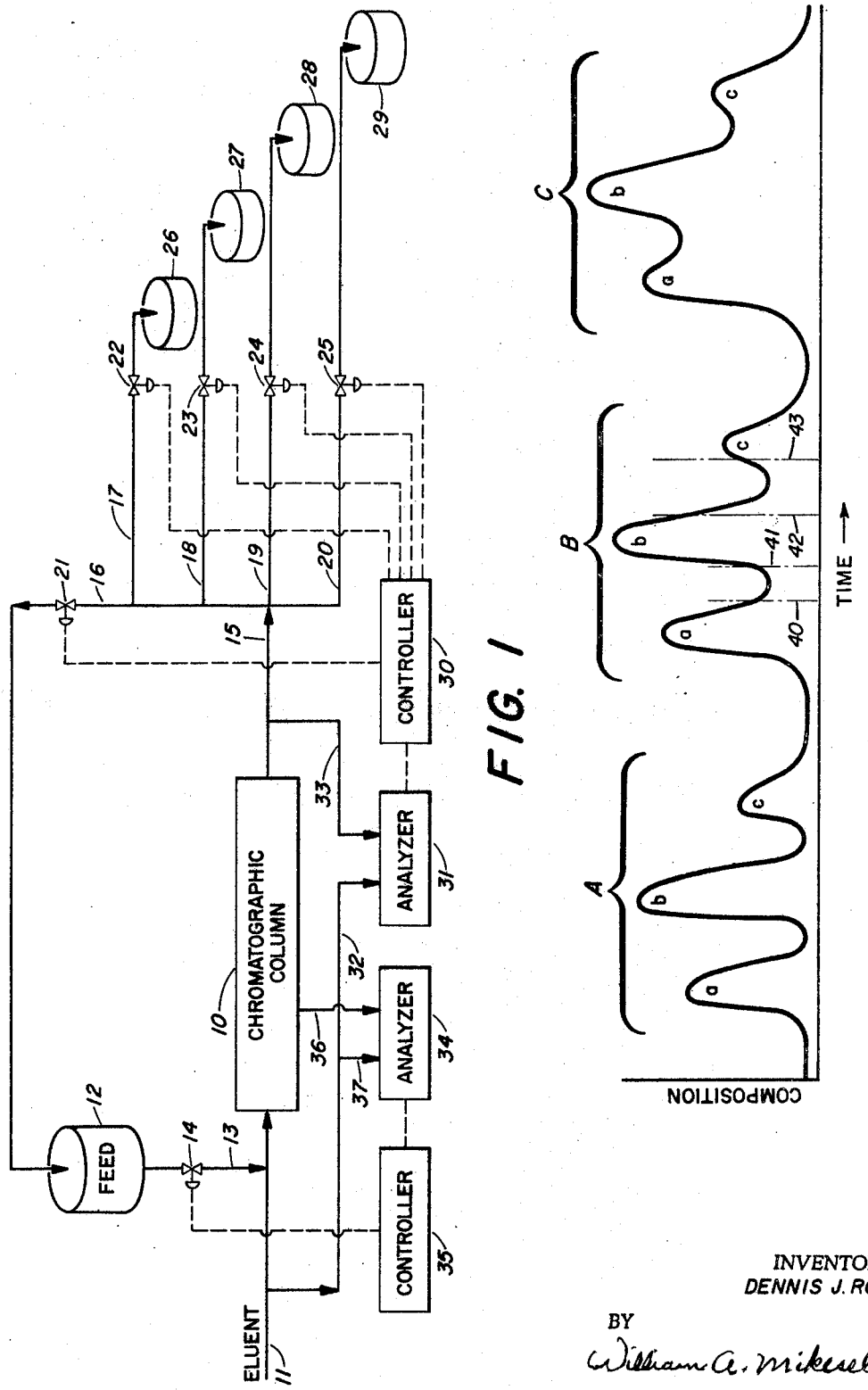
INVENTOR.
DENNIS J. ROYER
BY
William A. Mikesell Jr.
ATTORNEY United States Patent Office 3,494,104
Patented Feb. 10, 1970

3,494,104
CHROMATOGRAPHIC SEPARATION METHOD
AND APPARATUS
Dennis Jack Royer, Ponca City, Okla., assignor to Continental Oil Company, Ponca City, Okla., a corporation of Delaware
Filed Apr. 16, 1969, Ser. No. 816,729
Int. Cl. B01d 15/08
U.S. Cl. 55—67  6 Claims

ABSTRACT OF THE DISCLOSURE

Chromatographic separation of a mixture is improved by segregating from the product the portion comprising overlapping product peaks and returning this portion to the separation feed. The returned portion can correspond to or differ from the original feed composition.

DISCLOSURE

This invention relates to separation of fluid mixtures by chromatography. In one aspect, the invention relates to chromatographic separation wherein throughput rate is increased by recycling to the separation feed a portion of the separated product stream comprising the overlapping area of individual separated product peaks.

Chromatography, which was once confined to the laboratory as an analytical technique, has recently progressed to the point that it is capable of serving as a separation tool on a commercial or industrial scale. Separation of components on such scale has become known as "preparative chromatography." Because chromatography has evolved to a separation whereby the feed mixture in vaporous state is eluted through a separation zone containing usually a liquid partition agent on a solid support, the separation step has become known as "GLC" or gas-liquid chromatography. Various improvements in separation column geometry, partition agents, product component detection, process flow, etc., have been proposed toward the two-fold goal, viz a purer product at a higher rate, all of which have been to a greater or lesser extent frustrated by an inherent characteristic of chromatography, which is the tendency for "tailing" of one product component peak into the next.

It is accordingly an object of this invention to provide method and apparatus for increasing the throughput and/or purity in a chromatographic separation.

Other aspects, objects, and the several advantages of this invention will become apparent upon study of this closure, the appended claims, and the drawing, in which:

FIGURE 1 is a flow diagram in schematic form of a separation according to the present invention;

FIGURE 2 is a graphic representation of the separation of a three-component mixture achievable at various throughput rates.

Figure 3:
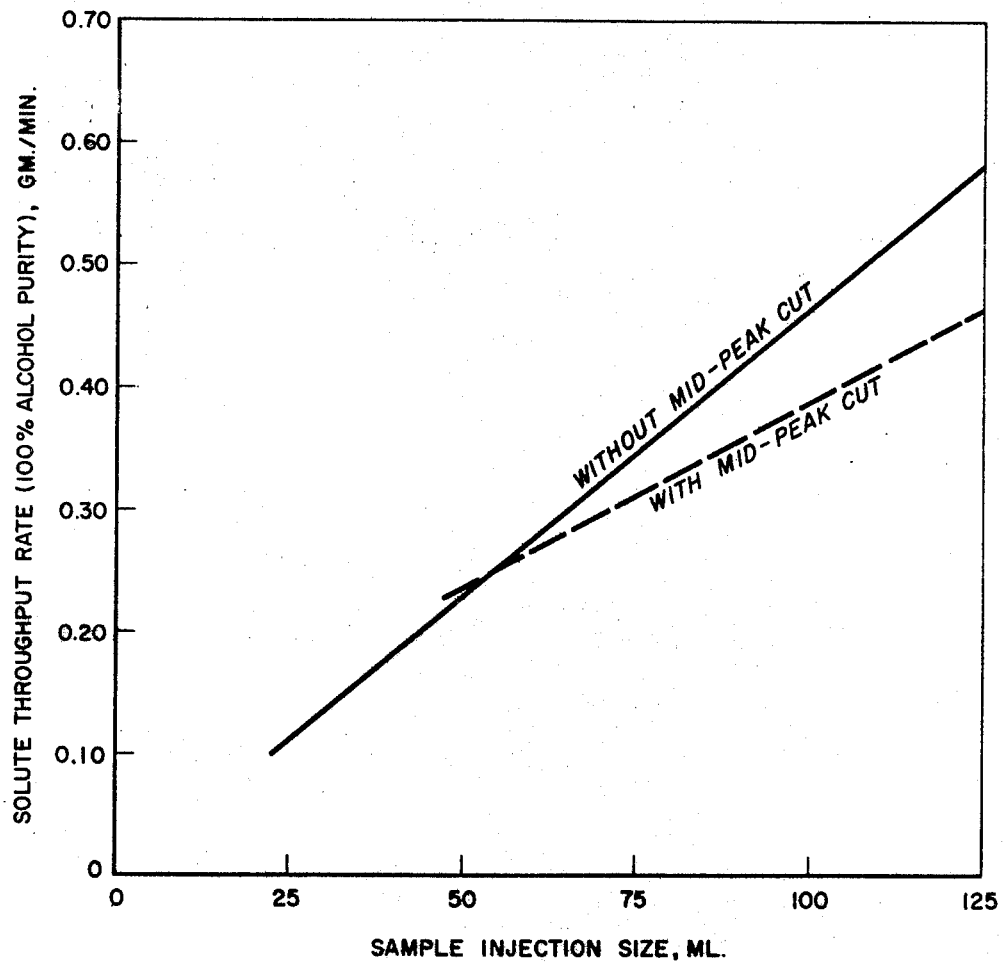
FIGURE 3 is a graph of separation versus throughput of a specific two-component mixture without and with use of the present invention.

According to the invention, I have discovered that the throughput of a given chromatographic column can be increased for a given product purity and conversely that product purity can be increased at a given throughput by a process which comprises segregating from the effluent of the column a portion comprising overlapping product peaks, and returning this segregated portion to the column feed. The column is preferably operated at a sufficiently high throughput to induce overlapping of peaks.

The invention will now be further illustrated by reference to the drawing. In FIGURE 1, a chromatographic column 10 is arranged to receive a flow of eluent or carrier gas from conduit 11. The feed mixture to be separated, which can comprise a vaporizable liquid or a gas, is passed from supply vessel 12 via conduit 13 and control valve 14 intermittently to conduit 11 so as to be carried into the column. Effluent from column 10 comprising spaced peaks or slugs of separated components from the feed to eluent gas, is passed via conduit 15 selectively to one of conduits 16, 17, 18, 19, or 20, depending upon which one of valves 21, 22, 23, 24, or 25 is open, the others being closed. Conduits 17–20 lead respectively to product storage tanks 26, 27, 28, and 29, while conduit 16 returns to feed tank 12. The system as shown provides for separation and storage of four components in tanks 26–29, although it is obvious that the invention is equally suitable for separation of more or less components than four. Valves 21–25 are actuated by a controller 30 responsive to signals from an analyzer 31. Analyzer 31, which can comprise a differential thermal conductivity cell or other suitable detector as known in the chromatography art, operates by comparing some physical property of a small stream of eluent gas as received by way of conduit 32 with that of a small stream of the eluent gas plus separated effluent component as received by way of conduit 33. The various components of the feed mixture emerge from column 10 in a fixed repetitive sequence, so that analyzer 31 need only recognize, for example, a change in sign of slope of the analysis curve and switch in response thereto the effluent from column 10 as contained in conduit 15 to the appropriate product receiver of 26–29. It is of course within the scope of this invention to effect switching of the column effluent on a time cycle basis, although use of an analyzer is more accurate and accordingly presently preferred. According to the present invention, a portion of the effluent from column 10 between the product component peaks is returned to the column feed; this is effected by opening valve 21 and closing valves 22–25 at the appropriate time, as will be further explained. The present invention also preferably requires operation of column 10 at such a feed loading that appreciable overlapping of peaks does occur, in order that throughput and product purity can be optimized. This is illustrated in FIGURE 2, which schematically presents a chart representing output of an analyzer such as 31 when operating on a 3-component mixture at various throughput rates. The component peaks of Group A illustrate the type of separation typically achieved by chromatography under conditions of light feed rate loading and/or long residence time, i.e. of low throughput, and it can be seen that segregation of the products represented by the individual peaks presents no problem. The peaks of Group B illustrate the effect of an increased throughput, as by increasing the size of individual feed slugs or by decreasing the residence time within the column, and the overlapping of the peaks to the extent that there is no return to base line between peaks can be seen. This indicates that, even at the minimum of a valley between adjacent peaks, it is not possible to achieve clean separation between components. The peaks of Group C illustrate a more extreme example of column overloading. Similar poor results can derive from the use of a poor separational substrate material, a column too short for the separation to be achieved, or other improper or poor column design or operation but, regardless of the cause of such overlapping, separation is improved by practice of the present invention.

The present invention also contemplates adjusting both the amount and the composition of the portion of column effluent being recycled to column feed by way of conduit 16. This is achieved, as illustrated in FIGURE 2, by varying the time at which column effluent is switched from one of conduits 17–20 to conduit 16 and vice versa. In FIGURE 2, the area between lines 40 and 41 represents a relatively narrow peak overlap cut, as opposed to that between lines 42 and 43. Of course, even narrower or broader cuts are contemplated. The point is that the composition between lines 40 and 41, comprising a certain percentage mixture of components $a$ and $b$, can be exactly duplicated by making the switch comprising point 40 earlier and that comprising point 41 later so that a larger amount of the same overlap composition is obtained. This results, of course, in purer products $a$ and $b$ but more recycle and thus less net column throughput.

Conversely, the area between 40 and 41 can be decreased, i.e. narrowed, resulting in smaller recycle amounts at the penalty of lower purity of individual products $a$ and $b$. It can also be seen that, by shifting both of lines 40 and 41 to the left, or to the right, the composition of the recycled portion can be varied so as to correspond with or differ from that of the fresh feed. Thus, controller 30 can be adjusted empirically for example to make the switches of valves 21–25, as required, at a certain finite time after passage of the maximum representing component "$a$" peak as detected by analyzer 30 at times 40 and 41. Similar considerations apply to adjusting of times 42 and 43 with respect to the recycle of the mixture comprising components $b$ and $c$, and to balancing between column throughput and purity of the desired individual components $b$ and $c$.

Another aspect of the present invention which is useful in increasing column throughput resides in the use of a second analyzer 34 and controller 35. In larger scale or preparative chromatography, it is quite common to construct separation column 10 as a plurality of short cylindrical vessels connected in series, rather than as a single long column as shown schematically. Such construction is convenient, although not a requisite, for effecting withdrawal of a sample stream at a point near the upstream end of column 10 as shown schematically e.g. by conduit 36. Analyzer 34 compares the composition of sample in conduit 36 with that of eluent from conduit 37 and, by means of controller 35, actuates valve 14. The objective of this system comprising analyzer 34, controller 35, and valve 14, is to detect the passage of a feed slug early, and to immediately follow it with another. Thus, once a given slug of feed has passed some distance into the column as detected by analyzer 34, an additional slug of feed can be introduced into the column without the necessity of waiting for the first slug to emerge from the column into conduit 15, which results in a substantial increase in the throughput capacity of the column.

The invention will now be further explained by reference to the following examples, which are illustrative and not limiting.

EXAMPLE 1

A mixture consisting of straight-chain primary alcohols, 38 weight percent $C_{20}$, 36 weight percent $C_{22}$, and the balance mainly alcohols of other carbon atom chain length, was separated in a chromatographic column of 4" O.D. and 10 ft. length packed with 25 weight percent DYLT polyethylene (Union Carbide Chemical Company) stationary phase on 30/60 mesh Chromosorb W diatomaceous silica (Johns-Manville Products Corp.) support. Two series of runs were made, one in which the overlap portion between product peaks are not removed, and a second in which this overlap portion was removed. Results are plotted in FIGURE 3. Intersection of the lines at low throughput indicate sample resolution, thus obviating the need of recycling an overlapped portion.

EXAMPLE 2

The mixture of Example 1 is separated using the same column as therein, with the removed mid-peak cut being recycled to the column feed. Results are as follows:

| Run No. | Mid-Peak Cut | Injection, Size, ml. | Throughput Rate, Variable Recycle, (gm./min.)/in.² | | Throughput Rate, 7.7% Constant Recycle (gm./min.)/in.² | |
|---|---|---|---|---|---|---|
| | | | $C_{20}$ | $C_{22}$ | $C_{20}$ | $C_{22}$ |
| 1 | No | 25 | 0.0113 | 0.0106 | 0.0113 | 0.0106 |
| 2 | No | 50 | 0.0320 | 0.0324 | 0.0320 | 0.0324 |
| 3 | Yes | 50 | 0.0195 | 0.0186 | 0.0195 | 0.0186 |
| 4 | No | 75 | 0.0377 | 0.0417 | 0.0377 | 0.0417 |
| 5 | Yes | 75 | 0.0213 | 0.0237 | 0.0309 | 0.0342 |
| 6 | No | 125 | 0.0457 | 0.0450 | 0.0457 | 0.0450 |
| 7 | Yes | 125 | 0.0205 | 0.0200 | 0.0334 | 0.0326 |

The specific finely divided solid support, separational substrate or stationary phase, and eluent or inert carrier gas to be used for a given separation will, as recognized in the art, be dependent upon the composition of the feed mixture being separated, and these aspects of the chromatographic separation do not comprise an inventive feature of the present invention. It is also not to be implied that practice of the present invention will increase gross throughput, but rather throughput at a given purity level.

Having thus described the invention by providing specific examples thereof, it is to be understood that no undue limitations or restrictions are to be drawn by reason thereof and that many variations and modifications are within the scope of the invention.

I claim:

1. The method of chromatographically separating a slug of a vaporous mixture of components by eluting said slug through a separation zone which selectively retards passage of said components therethrough which comprises:
   (a) analyzing the effluent from said separation zone to provide a signal representative of sequential peaks of increased concentration of individual said components as compared with their concentration in said slug,
   (b) directing, responsive to said analyzing, a portion of said effluent inclusive of one of said peaks to a product collection zone, and
   (c) directing, responsive to said analyzing, an intermediate portion of said effluent inclusive of portions of both components of two adjacent of said peaks to the feed of said separation zone.

2. The method of claim 1 wherein the composition of said intermediate portion corresponds in ratio approximately to that of said both components in said mixture.

3. The method of claim 1 wherein said eluting is effected at a rate such that there is a substantial overlap of two of said peaks.

4. The method of claim 1 further characterized by also analyzing said mixture at a point within said separation zone, and introducing an additional slug of said mixture responsive to said also analyzing.

5. A chromatographic separation device comprising:
(a) chromatographic column means containing material for selectively retarding passage therethrough of a vaporous mixture,
(b) feed means for passing a vaporous mixture to said column means,
(c) exit means for receiving vapors from said column means,
(d) analyzer means on said exit means for detecting sequential peaks of individual components of said mixture in said exit means,
(e) first control means responsive to said analyzer means for directing one of said peaks from said exit means to product receiver means, and
(f) second control means responsive to said analyzer means for directing vapors including overlapping portions of two adjacent of said peaks from said exit means to said feed means.

6. The device of claim 5 further including means for withdrawing vapor from said column means intermediate said feed means and said exit means, analyzing means on said means for withdrawing, and control means responsive to said analyzing means for activating said feed means.

References Cited

UNITED STATES PATENTS 3,002,583   10/1961   Findlay _____ 55—197 X

OTHER REFERENCES

Haarhoff et al., "Role of Sample Inlet Volume in Preparative Chromatography," Faraday Society, vol. 57, 1961, p. 1838.

JAMES L. DE CESARE, Primary Examiner